United States Patent [19]

Kao

[11] Patent Number: 5,404,769
[45] Date of Patent: Apr. 11, 1995

[54] ADJUSTABLE BICYCLE HANDLEBAR STEM

[76] Inventor: Cheng-Hsien Kao, 83, Chung Shan Rd., Tu Cheng City, Taiwan, Prov. of China

[21] Appl. No.: 245,532

[22] Filed: May 18, 1994

[51] Int. Cl.⁶ .............................................. B62K 21/16
[52] U.S. Cl. ................... 74/551.3; 280/279; 403/351; 403/367; 74/551.1
[58] Field of Search ................. 74/551.1, 551.3, 551.6, 74/551.7; 403/351, 352, 365, 367, 371, 372; 280/279, 280

[56] References Cited

U.S. PATENT DOCUMENTS

| | | | |
|---|---|---|---|
| 1,219,382 | 3/1917 | Dunlap | 403/352 |
| 3,124,370 | 3/1964 | Traugott | 403/372 |
| 4,616,949 | 10/1986 | Kellner | 74/551.1 |
| 5,319,995 | 6/1994 | Huang | 280/279 |

FOREIGN PATENT DOCUMENTS 226576  3/1963  Australia .............................. 403/352

*Primary Examiner*—Charles A. Marmor
*Assistant Examiner*—David Fenstermacher
*Attorney, Agent, or Firm*—Bacon & Thomas

[57] ABSTRACT

An adjustable bicycle handlebar stem which is based on a C-clamp enlarged adequately to accommodate a pair of half-cylindrical upper and lower adjusting members. The adjusting members are made as a hollow structure to decrease the weight of the bicycle. The upper and lower adjusting members are interlocked through the meshing of a keyway and slot. Since both adjusting members contain two symmetric eccentric curved notches to accommodate the bicycle handlebar, the position of the handlebar can be changed using the eccentric changes of the center of the adjusting members. The fore-and-aft distance and upper-and-lower angle of the handlebar can then be adjusted.

4 Claims, 4 Drawing Sheets

ADJUSTABLE BICYCLE HANDLEBAR STEM

BACKGROUND OF THE INVENTION (a) Field of the Invention

The present invention relates to an adjustable bicycle handlebar stem, particularly to a creative new design of an adjustable stem installed to hold bicycle handlebars.

(b) Description of the Prior Art

The structural design of a conventional handlebar stem is based on human engineering. To suit physical characteristics of human bodies, different sizes of handlebar stems are manufactured to fit a variety of hand positions of users. Sizes of stems are distinguished by the distance between the rod and the binder clamp of the stem. Basically, the standard sizes based on the measurement are 115 mm, 135 mm and 155 mm (or 120 mm, 140 mm and 160 mm). Sizes of handlebar stems used by cyclists change in relation to difference in age and body figure. Different requirements of consumers mean that bicycle manufacturers have to produce different sizes of stems to allow consumers to choose for different kinds of bicycle assemblies. However the size of the stems is fixed and cannot be adjusted. Therefore, manufacturers have to manufacture different stem sizes to meet customer needs. It creates huge inventories and increases molding costs. As a result, capital is tied down in inventory investment and cannot be directed for better use.

SUMMARY OF THE INVENTION

The main object according to the present invention is to provide an adjustable bicycle handlebar stem, which consists of a pair of half-cylindrical upper and lower adjusting members, with an eccentric notch on each of them, to clamp the bicycle handlebar. The adjusting members are fitted inside an appropriately enlarged C-clamp in front of the stem. By rotating the notches eccentrically, the position of the handlebar can be changed for adjusting its upper-and-lower angle and fore-and-aft distance. Thus, the present invention is a practical improvement over existing stems.

Another object according to the present invention is to provide a hollow structure of half-cylindrical upper and lower adjusting members using aluminum extruded shape or mill out manufacturing method. The hollow stem structure offers the weight-saving advantage without affecting the strength of the structure.

BRIEF DESCRIPTION OF THE DRAWINGS

The drawings disclose an illustrative embodiment of the present invention which serves to exemplify the various advantages and objects hereof, and are as follows.

DETAILED DESCRIPTION OF THE PREFERRED EMBODIMENT

Figure 1:
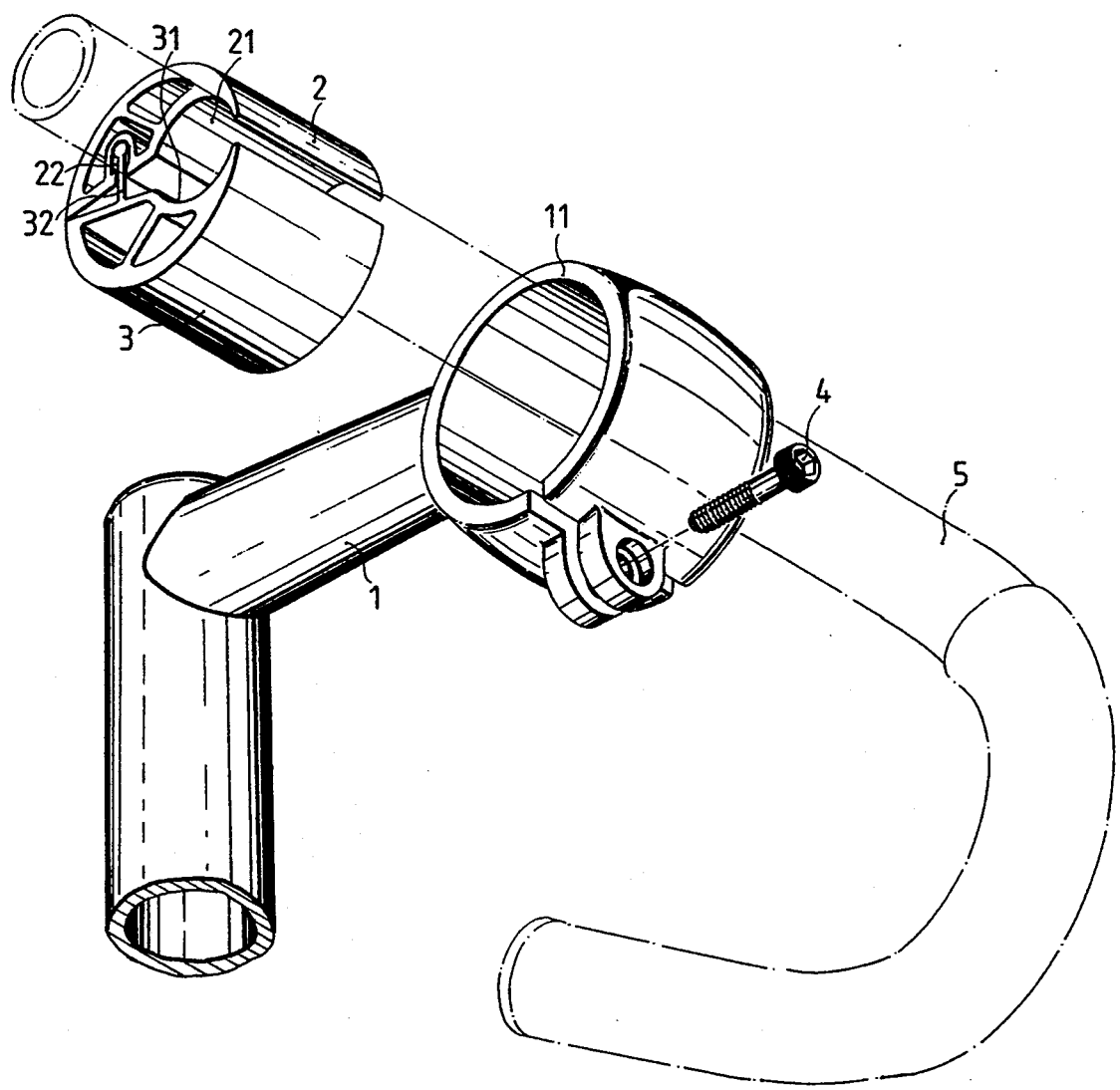
FIG. 1 is a perspective fragmented view of the present invention.
Figure 2:
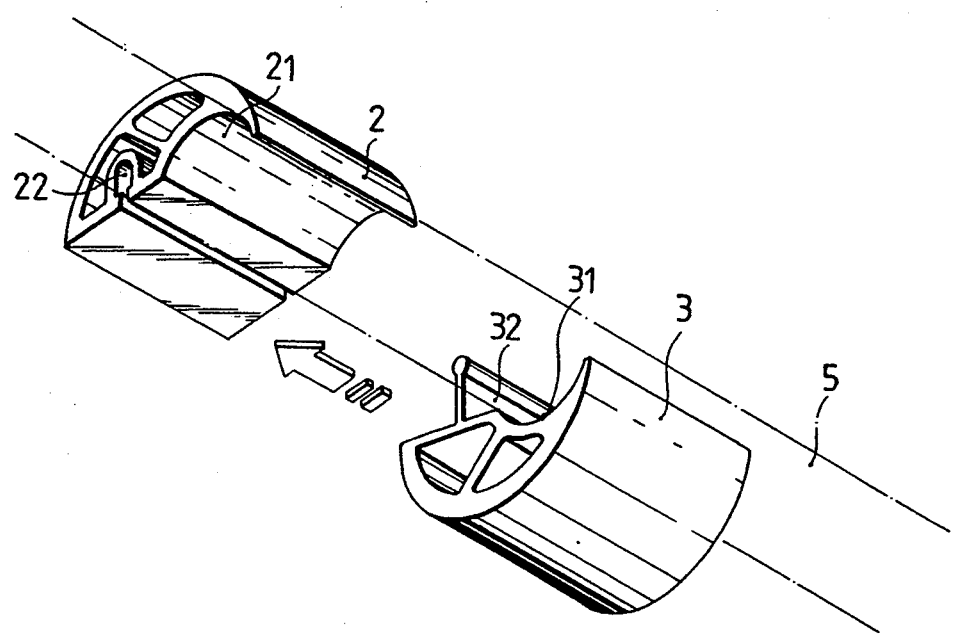
FIG. 2 is a perspective fragmented view of the upper and lower adjusting members of the present invention.

As shown in FIG. 1 and FIG. 2, the present invention is a creative design that aims at improving the adjustable stem clamped onto the bicycle handlebar. Not only does the invention enable upper-and-lower angle and fore-and-aft distance adjustments, it also makes the assembly process more convenient and easier. The structure of the adjustable handlebar stem of the present invention comprises a stem (1), an upper adjusting member (2) and a lower adjusting member (3). The stem has a C-clamp (11) in front, whose diameter is enlarged adequately for accommodating the upper and lower adjusting members (2) and (3). The upper adjusting member (2) is a half-cylindrical structure that contains a radial, eccentric curved notch (21) on one side, and a deep slot (22) with narrow opening on the other side.

The lower adjusting member (3) is also a half-cylindrical structure that contains a radial, eccentric curved notch (31) on one side, which is symmetrical with the curved notch (21) of the upper adjusting member (2). On the other side of the lower adjustable adjusting member (3) is a keyway (32). The keyway (32) is thin and high enough to slide inside the slot (22) of the upper adjusting member (2), yet its larger top part makes it impossible to slip out of the slot (22).

Figure 3:
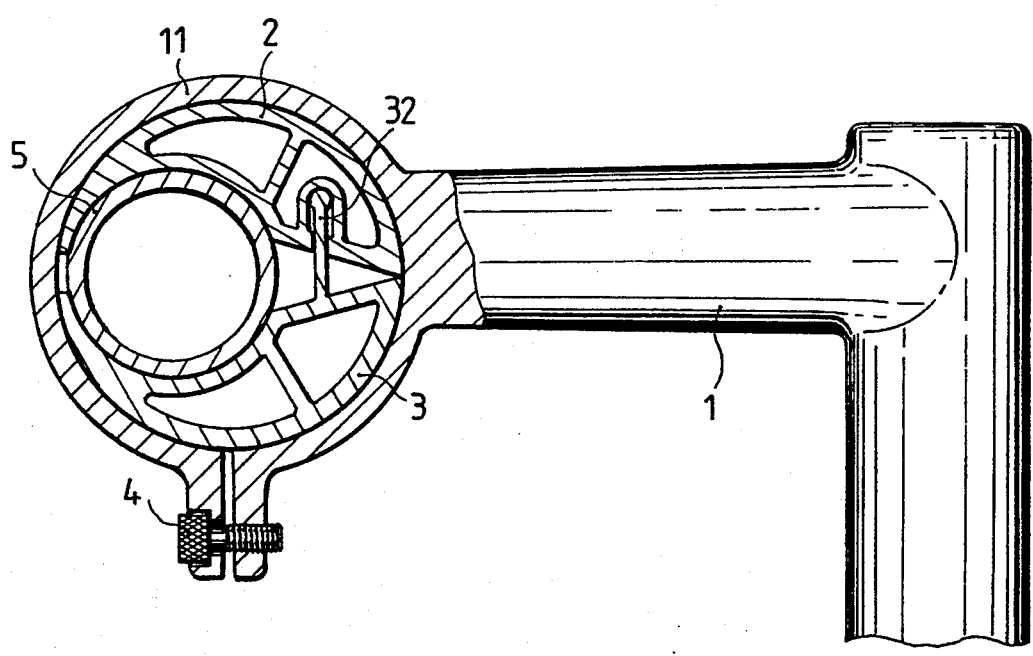
FIG. 3 is a sectional view of the assembly of the present invention.
Figure 4:
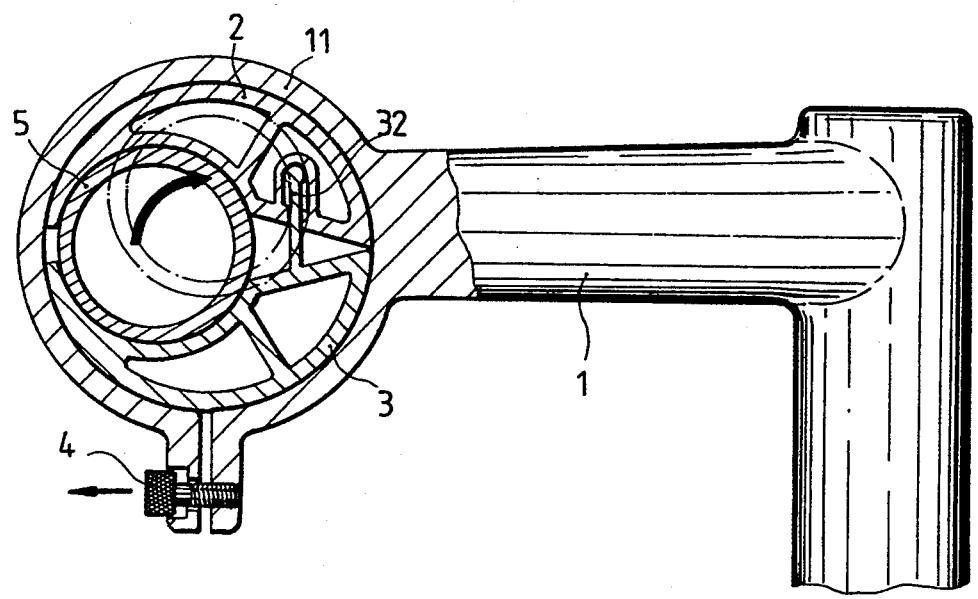
FIG. 4 is a diagrammatic sectional view showing the adjustment of the assembly according to the present invention.
Figure 5:
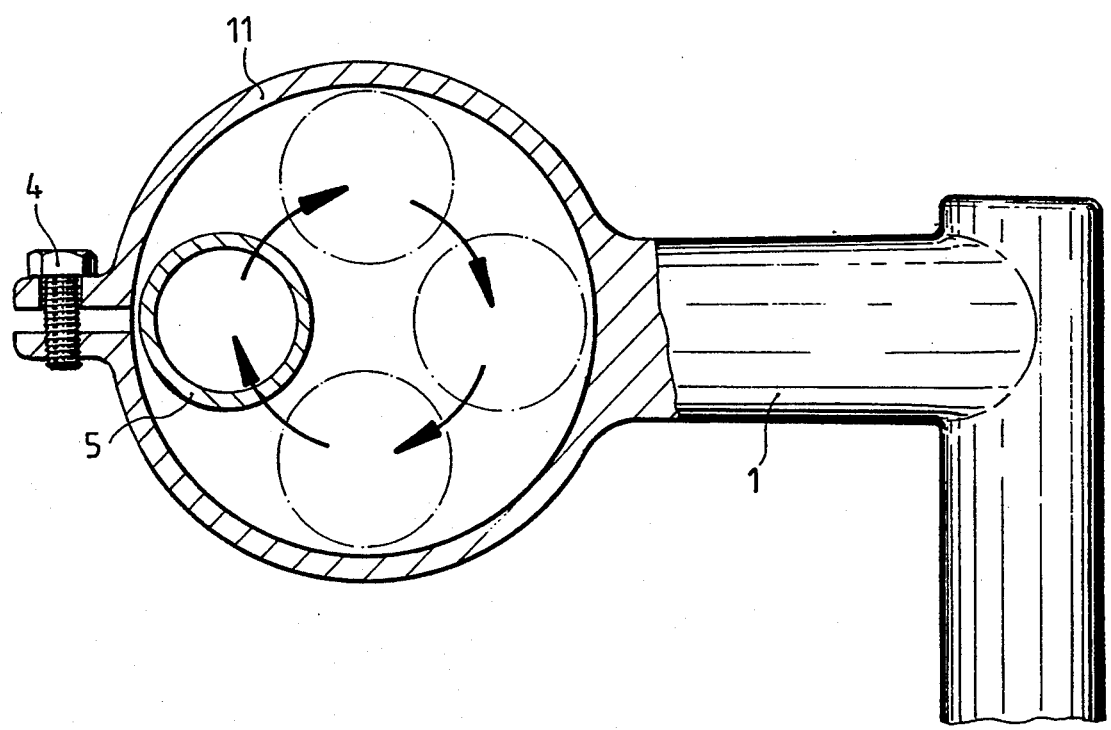
FIG. 5 is an embodiment showing another version of the adjustable handlebar stem according to the present invention.

The center section of the handlebar, where it is clamped inside the stem, is inserted inside the curved notch (31) of the lower adjusting member (3) to enable the upper adjusting member (2) to slide with one side of the lower adjusting member (3) into interlocking position. The objective is to lead the slot (22) of the upper adjusting member (2) and the keyway (32) of the lower adjustable adjusting member (3) to slide into interlocking position simultaneously, while the curved notch (21) of the upper adjusting member (2) still embraces the center section of the handlebar to be clamped inside the stem. The upper and lower adjusting members (2) and (3) and the clamped handlebar (5) are secured appropriately into the C-clamp (11) of the stem. A binder bolt (4) is threaded through the protruding section of the opening of the C-clamp (11) to fasten the components tightly. The position of the handlebar is thereby secured, as illustrated in FIG. 3. Moreover, FIG. 4 and FIG. 5 indicate that the binder bolt (4) can be loosened to adjust the fore-and-aft distance and upper-and-lower angle of the handlebar. When the binder bolt (4) is loosened, the upper and lower adjusting members (2) and (3) inside the C-clamp (11) can be rotated freely for adjustment. Besides, the opening and protruding section of the C-clamp (11) can be installed in suitable locations to meet requirements of different bicycle styles. The structure of the present invention consists of reasonably simple components that enable a complete functioning of the for-and-aft distance adjustment and upper-and-lower angle adjustment. It lowers manufacturing costs and eliminates the need to stock up different sizes. Capital can therefore be released for other uses. The present invention indeed provides a lot of economic advantages.

Figure 6:
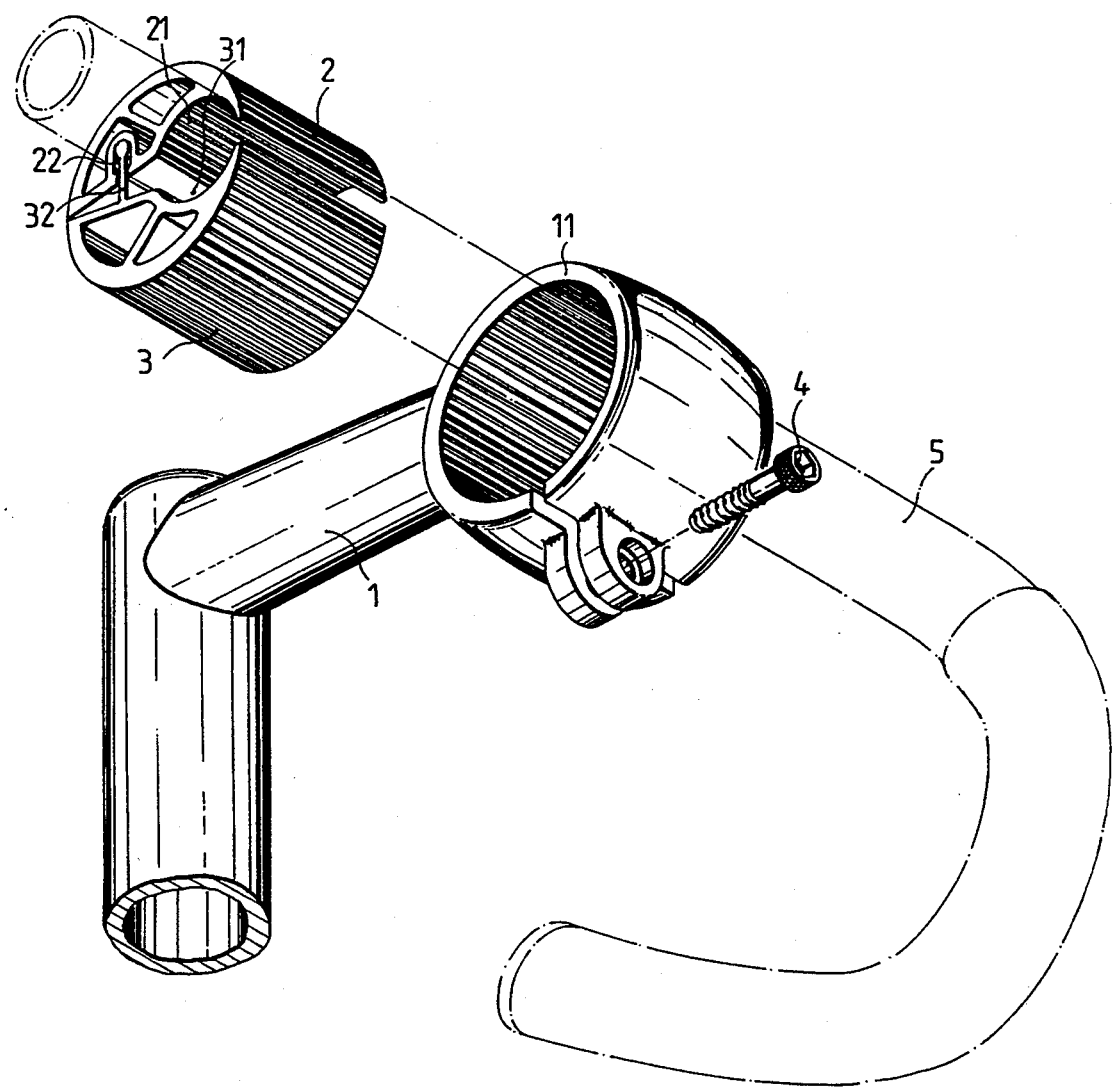
FIG. 6 is a perspective fragmented view showing another embodiment of the present invention.

As illustrated in FIG. 6, the interior of the C-clamp (11) and the curved notches (21) and (31) can be designed with slip-proof threaded lines, embossment or rough surface. This would secure even more effectively the positions of the upper and lower adjusting members (2) and (3) fitted inside the C-clamp (11), and the position of the handlebar (5) clamped in the curved notches (21) and (31) of the upper and lower adjusting members (2) and (3). Safety of the equipment is enhanced as well.

The aim of a light-weight bicycle has been taken into consideration when designing the components of the present invention. The upper and lower adjusting members (2) and (3) can be manufactured by means of aluminum extruded shape or mill out method to become a hollow structure. Without affecting the strength of the structure, the weight of the bicycle is lessened.

Although the invention has been described in its preferred form with a certain degree of particularity, it is understood that the present disclosure of the preferred form has been made only by way of example and numerous changes in the details of construction and the combination, and arrangement of parts may be resorted to without departing from the spirit and the scope of the invention as hereinafter claimed. It is intended that the patent shall cover, by suitable expression in the appended claims, whatever features of patentable novelty exist in the invention disclosed.

What is claimed is:

1. Apparatus for adjustably attaching a handlebar to a bicycle, comprising:
   a) a handlebar stem having a C-clamp portion defining a generally circular opening therethrough;
   b) a first adjusting member located in the generally circular opening and having a generally semi-cylindrical external surface, an eccentrically located first clamping notch, and a slot; and,
   c) a second adjusting member having a generally semi-cylindrical external surface, an eccentrically located second clamping notch and a key member extending therefrom, the second adjusting member located in the generally circular opening such that the key member engages the slot and the second clamping notch is located opposite the first clamping notch so that the handlebar extends through an opening defined by the first and second clamping notches eccentric to the C-clamp portion whereby the position of the handlebar relative to the stem may be adjusted by rotating the position of the first and second adjusting members relative to the C-clamp portion.

2. The apparatus of claim 1 further comprising:
   a) a first embossment formed on the C-clamp portion located within the generally circular opening;
   b) a second embossment formed on the first generally semi-cylindrical surface; and,
   c) a third embossment formed on the second generally semi-cylindrical surface whereby engagement of the second and third embossments with the first embossment prevents relative rotation between the adjusting members and the C-clamp portion.

3. The apparatus of claim 2 further comprising fourth and fifth embossments formed on the first and second clamping notches, respectively.

4. The apparatus of claim 1 wherein the first and second adjusting members are formed of extruded material.

* * * * *